Patented Feb. 20, 1951

2,542,886

UNITED STATES PATENT OFFICE 2,542,886

DENTIFRICE

Edward C. Wach, Chicago, Ill., assignor to The University of Illinois Foundation, a non-profit corporation of Illinois No Drawing. Application October 1, 1948, Serial No. 52,397

8 Claims. (Cl. 167—93)

This invention relates to a method of preventing dental caries and more particularly to a dentifrice for preventing dental caries.

Numerous dental caries studies have reported the absence of certain aciduric bacteria, particularly the absence of *Lactobacillus acidophilus* from the oral flora of individuals who have no caries. It has been shown that saliva from individuals who have active caries contains not only a large concentration of *Lactobacillus acidophilus*, but also that such saliva has the power to convert glucose rapidly into acid, whereas saliva from persons with no active caries does not. Procedures designed to test for caries activity have been developed based upon these observations.

I have invented and am herein disclosing and claiming a dentifrice for the prevention of dental caries by the reduction in the number of *Lactobacillus acidophilus* in the oral cavity and the prevention of the rapid conversion of glucose into acid.

It is known that cultures of saliva from caries inactive subjects develop properties inhibiting the growth of *Lactobacillus acidophilus*, while cultures of the saliva from caries active subjects develop no such inhibitory properties. It is also known that the *Lactobacillus acidophilus* has the ability of rapidly convertly glucose into acid and is in a large measure responsible for this action in the saliva of caries active persons.

It was discovered that inhibiting cultures produce ammonia nitrogen, while non-inhibiting cultures produce little or no ammonia nitrogen. It was further discovered that the addition of basic ammonium salts to a sterile broth medium produces a substance whose inhibitory ability parallels that of salivary cultures having a similar ammonia nitrogen concentration. All basic ammonium salts can be used and are effective, but the most effective when used alone is ammonium carbonate. Dibasic ammonium phosphate alone has a tendency to produce a stimulating effect on the growth of some undesirable bacteria. Acid ammonium salts have no inhibitory characteristics.

It was further discovered that many types of bacteria are present in the cultures of inhibitory saliva, but there is one bacterium, namely, bacterium *Lactis aerogenes*, consistently present. This organism has been established as an ammonifier acting upon the amino acids which have been found to be present in the saliva. The presence of at least twelve amino acids were found in human saliva and six deaminating systems, one of which systems is associated with *B. Lactis aerogenes*—namely, aspartic acid which is deaminated to ammonia by the products of *B. Lactis aerogenes* and particularly asparagin. Non-inhibiting cultures from saliva of caries active subjects rarely contain the above-named bacterium. The use of the dentifrices herein described will promote the growth of this organism.

The above discoveries were made under laboratory conditions, and it was not known if the inhibiting properties of ammonia nitrogen could be successfully adapted for use in the oral cavities of humans. A dentrifrice (the word "dentifrice" is herein used to include substances and compositions and solutions for introduction to the oral cavity, such as mouth washes, lozenges, chewing gum, tooth cleansers, and the like) containing a non-acid salt of ammonia will reproduce in a dentated human similar reductions in the count of *Lactobacillus acidophilus* encountered in previous laboratory experiments.

Stephan, Science 1940, 92:578, has advocated the use of urea in oral preparations not only for ammonia liberation but principally for its ability to inactivate carbohydrate degrading enzyme systems. He found that a tooth-paste containing 95% urea reduced caries activity 60 to 70 per cent in cases observed over a period of two years. Preliminary tests were made on the antibacterial and antienzymatic effect of carbamide combined in varying amounts with dibasic ammonium phosphate. Urea in large amounts, however, interferes with the enzyme systems which are present in saliva that are responsible for the natural production of ammonia. On the other hand, dibasic ammonium phosphate has a stimulating effect on bacterial growth. In vitro tests were conducted using caries active saliva. I found that there was a synergistic action when employing a combination of dibasic ammonium phosphate and urea. The addition of three per cent urea to five per cent dibasic ammonium phosphate gave optimal results. The combination was more effective than either substance used alone.

The effect of a three per cent urea solution on total acid production, on lactic acid formation, on ammonia nitrogen production, and on the aciduric bacterial flora in the same specimen of stimulated caries active saliva collected before breakfast is shown in Tables I to IV. The lactic acid determinations were made according to the method described by Friedemann and Graeser, the ammonia nitrogen by the Folin permutit method.

Table I

| Tube | Effect of 3% Urea Solution on Acid Production | | | | | | | |
|------|---------|---------|---------|---------|---------|---------|---------|---------|
|      | Initial | | 4 hours, 37° C. | | 24 hours, 37° C. | | 48 hours, 37° C. | |
|      | pH | T. T. Acid[1] | pH | T. T. Acid[1] | pH | T. T. Acid[1] | pH | T. T. Acid[1] |
| A    | 6.6 | 0.50 | 6.9 | 0.30 | 7.0 | 0.20 | 7.2 | 0.10 |
| B    | 6.6 | 0.50 | 4.5 | 1.40 | 4.1 | 2.30 | 3.8 | 3.00 |
| C    | 5.8 | 0.40 | 5.8 | 0.30 | 5.8 | 0.40 | 5.8 | 0.40 |
| D    | 6.4 | 0.60 | 6.8 | 0.10 | 7.6 | Alk. | 7.6 | Alk. |
| E    | 6.4 | 0.60 | 6.0 | 0.80 | 7.6 | Alk. | 7.8 | Alk. |

Tube A = 3 ml. saliva + 5 ml. distilled water.
Tube B = 3 ml. saliva + 1 ml. 20% glucose solution + 4 ml. distilled water.
Tube C = 8 ml. sterile 3% urea solution (control).
Tube D = 3 ml. saliva + 4 ml. 3% urea solution + 1 ml. distilled water.
Tube E = 3 ml. saliva + 4 ml. 3% urea solution + 1 ml. 20% glucose solution.
[1] Total titratable acidity determined using N/100 NaOH.

Table II

| Tube | Effects of 3% Urea Solution on Lactic Acid Production[1] | | | |
|------|---------|---------|---------|---------|
|      | Initial | 4 hours, 37° C. | 24 hours, 37° C. | 48 hours, 37° C. |
| A    | 0.202 | 0.202 | 4.20 | 0.20 |
| B    | 0.202 | 0.843 | 1.215 | 1.745 |
| C    | 000 | 000 | 000 | 000 |
| D    | 0.202 | 0.202 | 0.202 | 0.202 |
| E    | 0.202 | 2.283 | 5.523 | 7.821 |

[1] Reported in mg. per ml. tube contents. Tube contents same as described above.

Table III

| Tube | Effects of 3% Urea Solution on Ammonia Nitrogen Level[1] | | | |
|------|---------|---------|---------|---------|
|      | Initial | 4 hours, 37° C. | 24 hours, 37° C. | 48 hours, 37° C. |
| A    | 0.081 | Trace | 0.006 | 0.006 |
| B    | 0.081 | 000 | 000 | 000 |
| C    | 000 | 000 | 000 | 000 |
| D    | 0.081 | 0.1536 | 0.258 | 0.260 |
| E    | 0.081 | 0.04 | 0.240 | 0.310 |

[1] Reported in mg. per cent per 1 ml. tube contents.

Table IV

| Tube | Effect of 3% Urea Solution on Aciduric Flora | | |
|------|---------|---------|---------|
|      | Initial Colony Counts | 24 hours, 37° C. | 48 hours, 37° C. |
| A    | 213,000 | 180,000 | 195,000 |
| B    | 200,000 | 1,300,000 | Uncountable |
| D    | 180,000 | 10,000 | 3,000 |
| E    | 190,000 | 45,500 | No growth |

Tables V to VIII show the effect of a five per cent dibasic ammonium phosphate solution on total acid production, lactic acid formation, ammonia nitrogen production, and the aciduric bacterial flora, in the saliva of the same individual collected on a different day. The dibasic ammonium phosphate maintained the hydrogen ion concentration on the alkaline side in the presence of glucose although total titratable acids were developed during the forty-eight hour incubation period to almost the same level as occurred in the saliva without the ammonium phosphate. Equivalent amounts of lactic acid were produced in the saliva with and without the dibasic ammonium phosphate during forty-eight hours incubation although the ammonia did have a reducing effect on lactic acid production as shown by the difference at the four hour period. The analyses for ammonia nitrogen revealed that there was a reduction in ammonia in the presence of dibasic ammonium phosphate for reasons we do not know. The dibasic ammonium phosphate eliminated *Lactobacillus acidophilus* from the saliva during twenty-four hours incubation, but permitted the development of coccal organisms of the streptococcus and staphylococcus varieties. No bacteria survived the forty-eight hour incubation period.

Table V

| Tube | Effect of 5% Dibasic Ammonium Phosphate Solution on Acid Production | | | | | | | |
|------|---------|---------|---------|---------|---------|---------|---------|---------|
|      | Initial | | 4 hours, 37° C. | | 24 hours, 37° C. | | 48 hours, 37° C. | |
|      | pH | T. T. Acid[1] | pH | T. T. Acid[1] | pH | T. T. Acid[1] | pH | T. T. Acid[1] |
| A    | 7.0 | 0.20 | 7.1 | 0.10 | 7.2 | 000 | 7.4 | 000 |
| B    | 7.0 | 0.20 | 4.5 | 1.50 | 4.0 | 2.60 | 3.9 | 3.00 |
| C    | 7.7 | Alk. | 7.7 | Alk. | 7.7 | Alk. | 7.7 | Alk. |
| D    | 7.75 | Alk. | 7.8 | Alk. | 7.4 | 1.0 | 7.00 | 2.80 |

Tube A = 3 ml. saliva + 5 ml. distilled water.
Tube B = 3 ml. saliva + 1.0 ml. 20% glucose solution + 4 ml. distilled water.
Tube C = 3 ml. saliva + 4 ml. dibasic ammonium phosphate solution + 1 ml. distilled water.
Tube D = 3 ml. saliva + 4 ml. dibasic ammonium phosphate solution + 20% glucose solution (1 ml.).
[1] Total titratable acidity determined using N/100 NaOH.

Table VI

| Tube | Effect of 5% Dibasic Ammonium Phosphate Solution on Lactic Acid Production[1] | | | |
|------|---------|---------|---------|---------|
|      | Initial | 4 hours, 37° C. | 24 hours, 37° C. | 48 hours, 37° C. |
| A    | 0.146 | 0.146 | 0.146 | 0.146 |
| B    | 0.146 | 0.540 | 1.345 | 1.780 |
| C    | 0.146 | 0.146 | 0.146 | 0.146 |
| D    | 0.146 | 0 180 | 1.338 | 1.690 |

[1] Reported in mg. per ml. tube contents. Tube contents same as above.

Table VII

| Tube | Effect of 5% Dibasic Ammonium Phosphate Solution on Ammonium Nitrogen Level[1] | | | |
|------|---------|---------|---------|---------|
|      | Initial | 4 hours, 37° C. | 24 hours, 37° C. | 48 hours, 37° C. |
| A    | 0.081 | 0.006 | Trace | 000 |
| B    | 0.081 | .000 | 000 | 000 |
| C    | 3.461 | 3.450 | 3.410 | 3.365 |
| D    | 3.461 | 3.361 | 2.74 | 2.182 |

[1] Reported in mg. per cent per ml. tube contents.

Table VIII

| Tube | Effect of 5% Dibasic Ammonium Phosphate Solution on Aciduric Flora | | |
|------|---------|---------|---------|
|      | Initial Colony Counts | 24 hours, 37° C. | 48 hours, 37° C. |
| A    | 264,000 | 245,000 | 226,000. |
| B    | 248,000 | 1,600,000 | Uncountable. |
| C    | 260,000 | No lactobacilli, 38,000 coccal colonies. | No growth. |
| D    | 270,000 | No lactobacilli, 11,200 coccal colonies. | Do. |

The combined effect of three per cent urea and five per cent dibasic ammonium phosphate is demonstrated in Tables IX to XII. It will be noted that no measurable total titratable acidity developed in tube D, the saliva plus glucose specimen, that contained the combined urea and ammonium phosphate solution. Nor was there any lactic acid production.

Table IX

Effect of Combined Urea and Dibasic Ammonium Phosphate Solution on Acid Production

| Tube | Initial | | 4 hours, 37° C. | | 24 hours, 37° C. | | 48 hours, 37° C. | |
|---|---|---|---|---|---|---|---|---|
| | pH | T. T. Acid[1] | pH | T. T. Acid[1] | pH | T. T. Acid[1] | pH | T. T. Acid[1] |
| A | 6.8 | 0.40 | 6.8 | 0.50 | 7.0 | 0.10 | 7.2 | .000 |
| B | 6.8 | 0.40 | 4.6 | 1.60 | 4.0 | 2.20 | 3.9 | 2.90 |
| C | 7.8 | Alk. | 7.8 | Alk. | 7.8 | Alk. | 7.8 | Alk. |
| D | 7.8 | Alk. | 7.8 | Alk. | 7.8 | Alk. | 7.8 | Alk. |

Tube A = 3 ml. saliva + 5 ml. distilled water.
Tube B = 3 ml. saliva + 1 ml. of 20% glucose solution + 4 ml. distilled water.
Tube C = 3 ml. saliva + 1 ml. distilled water + 4 ml. combined solution.
Tube D = 3 ml. saliva + 1 ml. of 20% glucose solution + 4 ml. combined solution.
[1] Total titratable acidity determined using N/100 NaOH.

Table X

| Tube | Effects of Combined Solutions on Lactic Acid Production[1] | | | |
|---|---|---|---|---|
| | Initial | 4 hours, 37° C. | 24 hours, 37° C. | 48 hours, 37° C. |
| A | 0.202 | 0.202 | 0.202 | 0.202 |
| B | 0.202 | 0.500 | 1.435 | 1.910 |
| C | 0.202 | 0.202 | 0.202 | 0.202 |
| D | 0.202 | 0.202 | 0.160 | 0.210 |

[1] Reported in mg. per ml. of tube contents. Tube contents same as described above.

Table XI

| Tube | Effects of Combined Solution on Ammonia Nitrogen Level[1] | | | |
|---|---|---|---|---|
| | Initial | 4 hours, 37° C. | 24 hours, 37° C. | 48 hours, 37° C. |
| A | 0.008 | Trace | .000 | .000 |
| B | 0.008 | .000 | .000 | .000 |
| C | 3.461 | 3.660 | 3.621 | 3.450 |
| D | 3.461 | 3.660 | 3.640 | 3.430 |

[1] Reported in mg. per cent per ml. tube contents.

Table XII

| Tube | Effects of Combined Solution on Aciduric Flora | | |
|---|---|---|---|
| | Initial | 24 hours, 37° C. | 48 hours, 37° C. |
| A | 200,000 | 310,000 | 300,000. |
| B | 300,000 | 2,000,000 | Uncountable. |
| C | 285,000 | No growth | No growth. |
| D | 205,000 | do | Do. |

Saliva collected from thirty-five different caries active individuals treated similarly showed no lactic acid production in any instance. There was a slight rise in the ammonia nitrogen content as shown in Table XI after a few hours incubation. This increase was probably due to the action of salivary urease on the added urea. The aciduric bacterial flora was eliminated during twenty-four hours contact by the combined solution even in the specimen that contained the glucose (tube D). The antibacterial effect of the combined solutions was tested on the saliva of sixty caries active individuals with similar results.

The preferred formula for a mouth rinse is as follows:

| Rinse | Gms. or cc. |
|---|---|
| Dibasic Ammonium Phosphate | 50.0 |
| Carbamide | 30.0 |
| Glycerin | 100.0 |
| Alcohol | 40.0 |
| Soluble Saccharin | 1.0 |
| Menthol | 0.4 |
| Liquor Amaranth (U.S.P.) | 2.0 |
| Sodium Benzoate | 1.0 |
| Distilled Water | q. s. 1,000.0 |

The preferred formula for a tooth powder is as follows:

| Powder | Gms. or cc. |
|---|---|
| Dibasic Ammonium Phosphate | 50.0 |
| Carbamide | 30.0 |
| Bentonite | 50.0 |
| Soluble Saccharin | 2.0 |
| Menthol | 2.0 |
| Calcium Carbonate (ppt.) | 866.0 |
| Oil of Peppermint | 2.0 |
| Oil of Cinnamon | 1.9 |
| Oil of Wintergreen | 6.0 |
| Duponol | 10.0 |

One of the difficulties in employing urea in a composition for oral use is the pronounced bitter taste of the material. For this reason the selection of masking agents to cover the urea flavor presented a considerable problem. The use of sugar is, of course, undesirable because of its effect on bacterial growth.

While I have found that the proportion of five parts of dibasic phosphate to three parts of urea is the optimum, this proportion may be somewhat varied. The amount of urea, however, should not exceed substantially the amount of the ammonium compound, and the amount of the ammonium compound should not be substantially over three times the amount of the urea where the synergistic effect is desired.

The proportion of the ammonium compound in a dentifrice will, of course, depend upon the dilution which the dentifrice will encounter in the mouth. Obviously if a large proportion of dentifrice is used, the percentage of the urea and ammonium compound may be reduced. If the amount of urea is made too great, however, it is difficult to mask its taste. It is, therefore, preferred that the amount of urea should not exceed 10 per cent, and it is undesirable to have it fall below 1 per cent. The proportion of ammonium phosphate should not normally be above 6 to 7 per cent, and it should not fall below 1 per cent. In any event, the ammonium compound and the urea are used in therapeutic concentrations in the dentifrice that are sufficient, in a normal dentifrice dosage, to provide a concentration in the saliva of the mouth that will be inhibitory to the production of the *Lactobacillus Acidophilus*.

While ammonium phosphate is preferred, other alkaline ammonium salts may be employed in its place. Ammonium carbonate is a valuable salt for this purpose, but its instability reduces its value in a dentifrice.

The urea may be replaced by its chemical equivalents, but being a chemical normally occurring in body secretions, the urea is preferred.

This application is a continuation-in-part of the copending application Serial No. 721,156, filed January 9, 1947, in which Robert G. Kesel, Joseph F. O'Donnell, Ernst R. Kirch and Edward C. Wach are named as inventors. The applicant named in the present application is the sole inventor of a dentifrice containing the synergistic combination of a non-toxic, non-acid salt of ammonia and an amide such as urea.

The foregoing detailed description is given for clearness of understanding only, and no unnecessary limitations should be understood therefrom, for some modifications will be obvious to those skilled in the art.

I claim:

1. A dentifrice comprising approximately 3 per cent by weight of urea, 5 per cent by weight of dibasic ammonium phosphate and an inert non-sugary carrier adapted for oral administration.

2. A dentifrice comprising a major portion of a non-toxic, non-sugary carrier adapted for oral administration, containing from 1 to 10 parts by weight of urea and from 1 to 7 parts by weight of a non-toxic, non-acid salt of ammonia, there being at least 1% by weight of urea and at least 1% by weight of the salt of ammonia present in said dentifrice.

3. The dentifrice of claim 2 wherein said salt is a basic ammonium phosphate.

4. The dentifrice of claim 2 wherein said salt is ammonium carbonate.

5. The dentifrice of claim 2 wherein said dentifrice is a non-liquid material and includes a polishing agent.

6. A dentifrice comprising a major portion of a non-toxic, non-sugary carrier adapted for oral administration, containing from 1 to 10 parts by weight of urea and from 1 to 7 parts by weight of a dibasic ammonium phosphate, there being at least 1% by weight of urea and at least 1% by weight of the phosphate present in said dentifrice.

7. The dentifrice of claim 6 wherein the amount of urea is 3 parts by weight and the amount of phosphate is 5 parts by weight.

8. The dentifrice of claim 6, wherein the amount of dibasic ammonium phosphate is approximately 5%.

EDWARD C. WACH.

REFERENCES CITED

The following references are of record in the file of this patent:

UNITED STATES PATENTS

| Number | Name | Date |
|---|---|---|
| 1,377,780 | Lane | May 10, 1921 |
| 1,717,723 | McCall | June 18, 1929 |
| 1,969,340 | Vogt | Aug. 7, 1934 |
| 2,207,074 | Smith | July 9, 1940 |
| 2,452,054 | Jones | Oct. 26, 1948 |

FOREIGN PATENTS

| Number | Country | Date |
|---|---|---|
| 803,161 | France | June 29, 1936 |
| 291,565 | Germany | Apr. 22, 1916 |

OTHER REFERENCES

The Mfg. Chemist, November 1949, pp. 527–528.

Drug and Cosmetic Ind., September 1949, page 264.

The Amer. Perfumer and Essential Oil Review, sec. 1, July 1948, pages 29 and 31.

The Amer. Perfumer and Essential Oil Review, October 1949, page 281.

Mfg. Chemist and Perfumer, June 1942, page 140.

Grove, "The Biochemical Aspect of Dental Caries," The Dental Cosmos, October 1934, pages 1029–1036.

Stephan et al. "Effectiveness of Urea and of Synthetic Detergents in Reducing Activity of Human Dental Caries," Proc. Soc. Exp. Biol. and Med., February 1944, pages 101–104.